United States Patent
Brinkman et al.

(10) Patent No.: US 10,471,684 B2
(45) Date of Patent: *Nov. 12, 2019

(54) ALUMINIUM COMPOSITE MATERIAL WITH ALMGSI CORE LAYER

(71) Applicants: Henk-Jan Brinkman, Bonn (DE); Dietmar Schröder, Grevenbroich (DE); Thomas Wirtz, Hamburg (DE); Natalie Hörster, Köln (DE); Werner Kehl, Jork (DE); Olaf Engler, Bonn (DE)

(72) Inventors: Henk-Jan Brinkman, Bonn (DE); Dietmar Schröder, Grevenbroich (DE); Thomas Wirtz, Hamburg (DE); Natalie Hörster, Köln (DE); Werner Kehl, Jork (DE); Olaf Engler, Bonn (DE)

(73) Assignee: Hydro Aluminium Rolled Products GmbH, Grevenbroich (DE)

( * ) Notice: Subject to any disclaimer, the term of this patent is extended or adjusted under 35 U.S.C. 154(b) by 0 days.

This patent is subject to a terminal disclaimer.

(21) Appl. No.: 15/604,476

(22) Filed: May 24, 2017

(65) Prior Publication Data

US 2017/0259529 A1 Sep. 14, 2017

Related U.S. Application Data

(63) Continuation of application No. 14/206,153, filed on Mar. 12, 2014, now Pat. No. 9,796,157, which is a (Continued)

(30) Foreign Application Priority Data

Sep. 15, 2011 (EP) ..................................... 11181524

(51) Int. Cl.
 *B32B 15/01* (2006.01)
 *B23K 20/233* (2006.01)
 *C22C 1/05* (2006.01)
 *C22C 21/00* (2006.01)
 *C22C 21/08* (2006.01)
 (Continued)

(52) U.S. Cl.
 CPC ............ *B32B 15/016* (2013.01); *B23K 20/04* (2013.01); *B23K 20/2336* (2013.01); *C22C 1/05* (2013.01);
 (Continued)

(58) Field of Classification Search
 None
 See application file for complete search history.

(56) References Cited

U.S. PATENT DOCUMENTS 3,093,459 A 6/1963 Siebel
5,525,169 A 6/1996 Murtha
(Continued)

FOREIGN PATENT DOCUMENTS

CN 1526031 A 9/2004
CN 101432133 A 5/2009
(Continued)

*Primary Examiner* — Daniel J. Schleis
(74) *Attorney, Agent, or Firm* — Reinhart Boerner Van Deuren P.C.

(57) ABSTRACT

The invention relates to a strip consisting of an aluminum material for producing components with improved bending behavior and exacting shaping requirements, a method for producing the strip and the use of sheets produced from the strip according to the invention. The strip has a core layer of an AlMgSi alloy and at least one outer aluminum alloy layer arranged on one or both sides, made from a non-hardenable aluminum alloy, wherein the at least one outer aluminum layer has a lower tensile strength in the (T4) state than the AlMgSi layer, wherein the strip has a uniform strain ($A_g$) in the (T4) state of more than 23% transverse to the rolling direction and, at a thickness of 1.5 mm-1.6 mm, achieves a bending angle of less than 40° in a bending test.

8 Claims, 3 Drawing Sheets

Related U.S. Application Data continuation of application No. PCT/EP2012/068004, filed on Sep. 13, 2012.

(51) Int. Cl.
    *C22F 1/04*     (2006.01)
    *C22F 1/05*     (2006.01)
    *B23K 20/04*     (2006.01)

(52) U.S. Cl.
    CPC .............. *C22C 21/00* (2013.01); *C22C 21/08* (2013.01); *C22F 1/04* (2013.01); *C22F 1/05* (2013.01); *Y10T 428/12764* (2015.01)

(56) References Cited

U.S. PATENT DOCUMENTS

| | | |
|---|---|---|
| 6,280,543 B1 | 8/2001 | Zonker et al. |
| 6,994,760 B2 | 2/2006 | Benedictus et al. |
| 7,901,789 B2 | 3/2011 | De Smet et al. |
| 8,940,406 B2 | 1/2015 | Timm et al. |
| 8,968,882 B2 | 3/2015 | Lahaije |
| 9,359,660 B2 * | 6/2016 | Kamat .................... C22C 21/10 |
| 2009/0202860 A1 | 8/2009 | Lahaije |
| 2009/0214891 A1 | 8/2009 | Lahaye |
| 2010/0279143 A1 | 11/2010 | Kamat et al. |
| 2012/0222783 A1 | 9/2012 | Brinkman et al. |

FOREIGN PATENT DOCUMENTS

| | | |
|---|---|---|
| CN | 101437677 A | 5/2009 |
| CN | 100554486 C | 10/2009 |
| CN | 102031431 A | 4/2011 |
| CN | 102119078 A | 7/2011 |
| EP | 1852250 A1 | 11/2007 |
| EP | 2156945 A1 | 2/2010 |
| EP | 2270249 A1 | 1/2011 |
| WO | WO 2011/020556 A2 | 2/2011 |

* cited by examiner

ALUMINIUM COMPOSITE MATERIAL WITH ALMGSI CORE LAYER

CROSS-REFERENCE TO RELATED PATENT APPLICATIONS

This patent application is a continuation of U.S. patent application Ser. No. 14/206,153, filed Mar. 12, 2014, which is a continuation of PCT/EP2012/068004, filed Sep. 13, 2012, which claims priority to European Application No. 11181524.7, filed Sep. 15, 2011, the entire teachings and disclosure of which are incorporated herein by reference thereto.

FIELD OF THE INVENTION

The invention concerns a strip consisting of an aluminium material for production of components with high forming requirements, a method for production of the strip and the use of sheets produced from the strip according to the invention.

BACKGROUND OF THE INVENTION

In particular in automotive vehicle construction, but also in other application fields, for example aircraft construction or rail vehicle construction, metal sheets of aluminium alloy are required which are not only distinguished by particularly high strength values, but at the same time have a very good formability, and which enable high degrees of deforming. In automotive vehicle construction, typical application fields are the bodywork and chassis components. In the case of visible painted components, for example metal bodywork sheets which are visible from the outside, additionally the forming of the materials has to be carried out in such a manner that after painting, the surface appearance is not impaired by defects such as flow figures or roping. This is for example particularly important for the use of aluminium alloy sheets for production of bonnets and other bodywork components of an automotive vehicle. However, the choice of materials is restricted with regard to the aluminium alloy. In particular AlMgSi alloys, the main alloy constituents of which are magnesium and silicon, have relatively high strengths in state T6 with, at the same time, good formability in state T4, and excellent corrosion resistance. AlMgSi alloys are alloy types AA6XXX, for example alloy type AA6016, AA6014, AA6181, AA6060 and AA6111. Conventionally, aluminium strips are produced from an AlMgSi alloy by casting of a rolling ingot, homogenising of the rolling ingot, hot rolling of the rolling ingot and optional cold rolling of the hot strip. The homogenisation of the rolling ingot is carried out at a temperature of 380 to 580° C. for more than one hour. Owing to a final solution annealing operation at a typical temperature of 500 to 570° C. with subsequent quenching and natural ageing at around room temperature for at least three days, the strips can be delivered in state T4. State T6 is set after quenching, by means of artificial ageing at temperatures between 100° C. and 220° C.

It is problematic that, in hot-rolled aluminium strips of AlMgSi alloys coarse $Mg_2Si$ precipitations are present, which are broken and comminuted in the subsequent cold rolling due to the high degrees of forming. Hot strips of an AlMgSi alloy are usually produced in thicknesses of 3 to 12 mm and supplied to cold rolling with high forming strains. Since the temperature range in which the AlMgSi phases are formed is passed very slowly in conventional hot rolling, namely after coiling of the hot strip, these phases form very coarsely. The temperature range for forming the above phases is alloy-dependent. However, it lies between 550 and 230° C., i.e. in the range of the hot-rolling temperatures. It could be proven experimentally that these coarse phases in the hot strip have a negative influence on the elongation of the end product. This means that the formability of aluminium strips made of AlMgSi alloys could previously not be fully exploited.

In the published European patent application EP 2 270 249 A1, belonging to the same Applicant, the AlMgSi alloy strip has a temperature of maximum 130° C. directly after exiting from the last hot-rolling pass and is coiled with this or a lower temperature. By quenching the hot strip in this method, aluminium strips can be produced in state T4, which in state T4 have an elongation at break $A_{80}$ of over 30% or a uniform elongation $A_g$ of more than 25%. In addition in state T6, very high values for the uniform elongation $A_g$ and elongation at break $A_{80}$ were achieved. In the said application fields, however, in addition the problem arises that frequently tight bends and flanging are required. A typical application comprising bending and flanging and high requirements for formability is for example an inner door panel of a motor vehicle. Although good results were achieved in bending tests with former AlMgSi alloy strips, but a further improvement of the bending behaviour, in particular taking into account the said application, would be desirable.

On this basis, the present invention faces the object of producing a strip consisting of an aluminium material for production of components with high forming requirements, which strip has an improved bending behaviour.

SUMMARY OF THE INVENTION

According to a first teaching of the present invention, the object outlined above is achieved in that the strip comprises a core alloy of an AlMgSi alloy and at least one external aluminium alloy layer arranged on one or both sides and made of a non-hardenable aluminium alloy, wherein the at least one external aluminium alloy layer has a lower tensile strength than the core layer of the AlMgSi alloy in state T4, wherein the strip in state T4 has a uniform elongation $A_g$ of more than 23% transverse to the rolling direction, and with a thickness of 1.5 to 1.6 mm, a bend angle of less than 40° in the bending test transverse to the rolling direction.

Surprisingly it has been found that a strip of aluminium alloy composite material with a core layer of an AlMgSi alloy and at least one external aluminium alloy layer arranged on one or both sides and consisting of a non-hardenable aluminium alloy which has a lower tensile strength in state T4 than the AlMgSi alloy, leads to a significantly improved bending behaviour in state T4 than the uncoated AlMgSi alloy strip. Preferably the elongation at break $A_{80}$ of the external aluminium alloy layers in the recrystallised state, i.e. also in state T4, is greater than that of the core alloy layer of an AlMgSi alloy in state T4. On tight bending of the strip, a significantly flatter and cleaner bending edge is achieved up to the maximum achievable bend angle. Previously, with bends required for example on flanging, the problem occurred that cracks or roughness occurred in the region of the bend edge. It is assumed that the softer external aluminium alloy layers allow a "spreading" of unevenness on bending, so that significantly smaller bend angles are achieved with almost identical mechanical properties compared with an uncoated strip of an AlMgSi alloy. For the external layers, in particular film alloys can be used, for example of type AA8XXX i.e. AA8011, AA8006, AA8079 etc., but also other low-alloyed aluminium alloys of type AA1XXX, such as for example AA1200 or an aluminium alloy of type AA5005 or AA5005A, which in state 0, i.e. for example after solution annealing and quenching, have tensile strengths in the recrystallised state of less than 180 MPa. The bend angle of less than 40° achieved in bending tests transverse to the rolling direction allows a better flanging and bending behaviour of the produced strip during use, for example in motor vehicle construction.

Recognised methods from the automotive industry were used to determine the maximum achievable bend angle. For the bending test, first specimens of size 270 mm×60 mm are cut from the strip transverse to the bending direction and subjected to pre-elongation perpendicular to the bending line, i.e. perpendicular to the rolling direction. The pre-elongation is 10%. Then via a bending punch, the specimen is bent between two rollers with a diameter of 30 mm. The roller spacing is twice the strip thickness (table 2), preferably also twice the strip thickness of the specimen plus 0.5 mm (table 3). On bending of the specimen by the bending punch with a punch radius of 0.4 mm, the force with which the bending punch bends the specimen is measured and the bending process ended after exceeding a maximum and falling by 30 N from this maximum. Then the opening angle of the bent specimen is measured. The bending behaviour of the specimen is usually measured transverse to the rolling direction in order to obtain a reliable conclusion on the bending behaviour in the production of components with high forming requirements. As already stated, surprisingly it was found that the specimens produced from the strip according to the invention allowed significantly smaller bend angles than the specimens produced from conventional uncoated AlMgSi alloy strip, and to this extent could be processed better into components, for example a door inner panel.

According to a first embodiment of the strip according to the invention, a further improved bending behaviour and hence a wider area of application can be achieved in that the strip in state T4 has a uniform elongation of $A_g$ of more than 25%.

As well as the good uniform elongation properties of the strip according to the invention, for further processing into a finished, usable product, it is advantageous if the strip in state T4 has a yield point Rp0.2 of 70 to 140 MPa, and a tensile strength Rm of 170 to 220 MPa. Said strength values firstly guarantee adequate stiffness in the production of different components by forming, for example by deep drawing or bending. In addition the forming forces required are moderate because of the yield point Rp0.2 of 70 to 140 MPa.

Even greater degrees of forming can be achieved according to a next embodiment of the strip according to the invention, in that the strip has an elongation at break $A_{80}$ transverse to the rolling direction of at least 27%, preferably at least 29%.

According to a further advantageous embodiment of the strip according to the invention, the thickness of the external aluminium alloy layers arranged on one or both sides is in each case 5 to 15% of the final thickness of the strip. This guarantees that the forming properties and the strength properties of the core alloy layer of an AlMgSi alloy substantially determine the production method and later product properties, so that the benefits of the hardenable core alloy are utilised.

In addition, according to a further embodiment of the strip according to the invention, to reach the maximum achievable bend angle it is advantageous if the external aluminium alloy layers have a mean grain size of less than 50 µm, preferably less than 25 µm. It could be found that the finer the grain of the external aluminium alloy layer, the smaller the achievable bend angle.

According to a further embodiment example, if the at least one external aluminium alloy layer consists of an aluminium alloy of type AA8079, for example a particularly fine-grained aluminium alloy layer can be produced which influences the bending behaviour optimally. The aluminium alloy AA8079 has the following alloy constituents in w. %:
0.05%≤Si≤0.30%,
0.7%≤Fe≤1.3%,
Cu≤0.05%,
Zn≤0.10%,
remainder Al and unavoidable contaminants individually maximum 0.05 and in total maximum 0.15%. AA8079 is a typical film alloy, as are aluminium alloys AA8011 and AA8006.

According to a further alternative embodiment, the at least one external aluminium alloy layer consists of an aluminium alloy of type AA5005A which has the following constituents in w. %:
Si≤0.3%,
Fe≤0.45%,
Cu≤0.05%,
Mn≤0.15%,
0.7%≤Mg≤1.1%,
Cr≤0.1%,
Zn≤0.20%,
remainder Al and unavoidable contaminants individually maximum 0.05%, in total maximum 0.15%.

This aluminium alloy, also designated AlMg1, firstly achieves a slightly improved strength of the aluminium composite material and in addition is compatible with other aluminium materials which are used in particular in motor vehicle construction.

According to a next embodiment of the strip according to the invention, the core layer consists of an aluminium alloy type AA6XXX, preferably AA6014, AA6016, AA6060, AA6111 or AA6181. The common feature of all alloy types AA6XXX is that they are characterised by a particularly high forming behaviour due to the high elongation values in state T4, and high strengths or yield points in usage state T6, in particular after artificial ageing at 205° C./30 min.

An aluminium alloy type AA6016 has the following alloy constituents in weight percent:
0.25%≤Mg≤0.6%,
1.0%≤Si≤1.5%,
Fe≤0.5%,
Cu≤0.2%,
Mn≤0.2%,
Cr≤0.1%,
Zn≤0.1%,
Ti≤0.1%,
and remainder Al and unavoidable contaminants total maximum 0.15%, individually maximum 0.05%.

For magnesium contents of less than 0.25 w. %, the strength of the aluminium strip provided for structural applications is too low, and on the other hand the formability deteriorates with magnesium contents above 0.6 w. %. Silicon in conjunction with magnesium is substantially responsible for the hardenability of the aluminium alloy and hence also for the high strengths which can be achieved in applications, for example after paint baking. With Si contents of less than 1.0 w. %, the hardenability of the aluminium strip is reduced so that in applications, only reduced strengths can be achieved. Si contents of more than 1.5 w. % lead to no improvement in the hardening behaviour. The Fe proportion should be limited to maximum 0.5 w. % in order to prevent coarse precipitations. A restriction of the copper content to maximum 0.2 w. % leads above all to an improved corrosion resistance of the aluminium alloy in the specific application. The manganese content of less than 0.2 w. % reduces the tendency to form coarser manganese precipitations. Although chromium ensures a fine microstructure, it must be limited to 0.1 w. % in order to again avoid coarse precipitations. The presence of manganese however improves the weldability by reducing the crack tendency or quenching sensitivity of the aluminium strip according to the invention. A reduction in the zinc content to maximum 0.1 w. % in particular improves the corrosion resistance of the aluminium alloy or finished sheet in the application concerned. In contrast, titanium ensures a finer granulation during casting but should be restricted to maximum 0.1 w. % to guarantee a good castability of the aluminium alloy.

An aluminium alloy of type AA6060 has the following alloy constituents in weight percent:
0.35%≤Mg≤0.6%,
0.3%≤Si≤0.6%,
0.1%≤Fe≤0.3%,
Cu≤0.1%,
Mn≤0.1%,
Cr≤0.05%,
Zn≤0.10%,
Ti≤0.1%, and
remainder Al and unavoidable contaminants, maximum total 0.15%, individually maximum 0.05%.

The combination of precisely predefined magnesium content with an Si content which is reduced in comparison with the first embodiment, and a tightly specified Fe content, gives an aluminium alloy with which the formation of $Mg_2Si$ precipitations can be prevented particularly well after hot rolling with the method according to the invention, so that a sheet with improved elongation and high yield point can be produced in comparison with conventionally produced sheets. The lower upper limits of the alloy constituents Cu, Mn and Cr reinforce the effect of the method according to the invention. With regard to the effects of the upper limits of Zn and Ti, reference is made to the statements on the first embodiment of the aluminium alloy.

An aluminium alloy type AA6014 has the following alloy constituents in weight percent:
0.4%≤Mg≤0.8%,
0.3%≤Si≤0.6%
Fe≤0.35%,
Cu≤0.25%,
0.05%≤Mn≤0.20%,
Cr≤0.20%,
Zn≤0.10%,
0.05%≤V≤0.20%,
Ti≤0.1%, and
remainder Al and unavoidable contaminants to maximum total 0.15%, individually maximum 0.05%.

An aluminium alloy type AA6181 has the following alloy constituents in weight percent:
0.6%≤Mg≤1.0%,
0.8%≤Si≤1.2%,
Fe≤0.45%,
Cu≤0.10%,
Mn≤0.15%,
Cr≤0.10%,
Zn≤0.20%,
Ti≤0.1%, and
remainder Al and unavoidable contaminants to the maximum total 0.15%, individually maximum 0.05%.

An aluminium alloy type AA6111 has the following alloy constituents in weight percent:
0.5%≤Mg≤1.0%,
0.7%≤Si≤1.1%,
Fe≤0.40%,
0.50%≤Cu≤0.90%,
0.15%≤Mn≤0.45%,
Cr≤0.10%,
Zn≤0.15%,
Ti≤0.1%, and
remainder Al and unavoidable contaminants to the maximum total 0.15%, individually maximum 0.05%. The alloy AA6111 in principle has higher strength values in usage state T6 because of the increased copper content, but should be regarded as more susceptible to corrosion.

All aluminium alloys listed are specifically adapted in their alloy constituents to different applications. As already stated, strips of these aluminium alloys, which were produced using the method according to the invention, have particularly high uniform elongation values in state T4 paired with a particularly pronounced increase in the yield point, for example after artificial ageing at 205° C./30 min. This also applies to aluminium strips subjected to heat treatment after solution annealing in state T4.

According to a second teaching of the present invention, the object outlined above for a method for production of a strip from an aluminium composite material is achieved in that a rolling ingot is cast from an AlMgSi alloy, the rolling ingot undergoes homogenisation, a cladding layer applied at least on one or both sides of the rolling ingot, and the rolling ingot together with the applied cladding layers brought to hot rolling temperature, hot rolled, then optionally cold rolled to final thickness, and the finished rolled strip solution annealed and quenched, wherein the at least one cladding layer consists of a non-age-hardenable aluminium alloy which has a lower tensile strength in state T4 than the core layer of an AlMgSi alloy, the hot strip immediately after being discharged from the last hot-roll pass has a temperature of maximum 250° C., preferably a temperature of maximum 230° C., in particular preferably a temperature of 230 to 200° C., and the hot strip is coiled with this or a lower temperature. In principle the strip can also be cooled to a temperature of less than 200° C. In addition it is conceivable that the strip is made from an aluminium composite material by use of simultaneous casting and then hot rolled according to the invention.

It has been shown that quenching of the hot strip, even after roll cladding in which hot-rolling temperatures are used, leads to a particularly favourable microstructure of the hot strip which in particular has high elongation at break values $A_{80}$, uniform elongation values $A_g$ and in additional has an improved bending behaviour because of the external aluminium alloy layers. The temperature corridor of the hot strip immediately after exiting the last hot-roll pass, which extends from 135° C. to 250° C., allows a high production rate with simultaneously good process reliability even in production of aluminium composite materials.

According to a further embodiment of the method according to the invention, a process-reliable cooling is achieved in that the hot strip is quenched to coiling temperature using at least one plate cooler and the hot-roll pass itself, loaded with emulsion. A plate cooler consists of an arrangement of cooling or lubricating nozzles which spray a rolling emulsion onto the aluminium alloy strip. The plate cooler can be present in a hot rolling mill in order to cool the rolled hot strips to rolling temperature before hot rolling, and to be able to achieve a higher production speed.

According to a further embodiment of the method according to the invention, if the hot-rolling temperature of the hot strip before the cooling process during hot rolling, in particular before the penultimate hot-roll pass, is at least 230° C., preferably above 400° C., particularly small MgSi precipitations can be produced in the quenched hot strip since at these temperatures, the majority of the alloy constituents magnesium and silicon are present in the dissolved state in the aluminium matrix. This advantageous state of the hot strip is achieved in particular at temperatures of 470° C. to 490° C. before the start of the cooling process, which preferably takes place within the last two roll passes, and is quasi-set by quenching.

According to a further embodiment of the method according to the invention, the hot-rolling temperature of the hot strip after the penultimate roll pass is 290 to 310° C. It has been found that these temperatures firstly allow adequate setting of the precipitates and secondly, at the same time, the last roll pass can be carried out without problems. On exit, according to a next advantageous embodiment, the hot strip has a temperature of 230 to 200° C., so that a maximum process speed can be achieved on hot rolling without deterioration of the properties in state T4 of the finished strip made of aluminium composite material.

According to a further embodiment of the method according to the invention, the finished rolled aluminium strip is subjected to heat treatment, wherein the aluminium strip is heated to more than 100° C. after solution annealing and quenching, and then coiled and aged at a temperature of more than 55° C., preferably more than 85° C. This embodiment of the method, after natural ageing with a shorter warming phase at lower temperatures, allows state T6 to be set in the strip or sheet, in which state the strips or sheets formed into components are used in the application. This rapidly hardening aluminium strip is for this merely brought to temperatures of around 180° C. for only 20 minutes in order to achieve the higher yield point values in state T6.

The thickness of the finished hot strip is 3 to 12 mm, preferably 5 to 8 mm, so conventional cold-rolling mills can be used for cold rolling.

According to a further embodiment of the method according to the invention, the core layer of the strip according to the invention consists of an aluminium alloy of type AA6XXX, preferably AA6014, AA6016, AA6060, AA6111 or AA6181, and the external aluminium alloy layers consist of an alloy type AA8XXX, AA8079, AA1XXX, AA1200, AA5005 or AA5005A. For the benefits of the individual alloy types, reference is made to the statements above. Evidently both external aluminium alloy layers of different thicknesses and/or external aluminium layers consisting of different aluminium alloy layers can be used. In addition the combination of said alloy types in the aluminium alloy composite material gives an excellent bending behaviour with simultaneously very high forming capacity in state T4.

Finally, according to a third teaching of the present invention, the object outlined above is achieved by the use of a sheet made from a strip according to the invention as a component, chassis or structural part or panel in automotive, aircraft or railway vehicle construction, in particular as component, chassis part, external or internal panel in automotive engineering, preferably as a bodywork element. As already explained above, the strip according to the invention of aluminium material is distinguished not only by its extraordinary forming properties, in particular a very high uniform elongation $A_g$ transverse to the rolling direction, but in addition with the strip according to the invention, extreme bend angles can be achieved which occur in said applications, in particular in flanged folds. Furthermore small radii in the component can be realised in a better way.

BRIEF DESCRIPTION OF THE DRAWINGS

The invention will now be explained in more detail below with reference to embodiment examples in conjunction with the drawing. The drawing shows.

DETAILED DESCRIPTION OF THE INVENTION

Figure 1A:
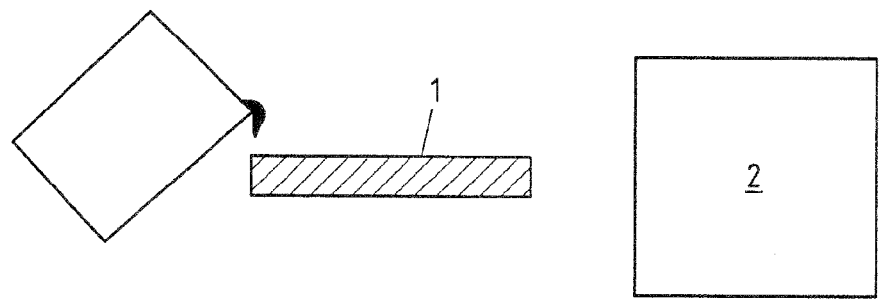
FIGS. 1a)-e) diagrammatically, the sequence of the embodiment example of the method according to the invention.

FIGS. 1a) to e) show first a diagrammatic flow diagram of an embodiment example of the method according to the invention for production of a strip according to the present invention, with steps a) production and homogenising of the rolling ingot, b) application of the cladding layers to the rolling ingot, c) hot rolling or roll cladding of the rolling ingot, d) cold rolling, and e) solution annealing with quenching.

First a rolling ingot 1 is cast from an aluminium alloy with the following alloy constituents in w. %:
0.25%≤Mg≤0.6%,
1.0%≤Si≤1.5%,
Fe≤0.5%,
Cu≤0.2%,
Mn≤0.2%,
Cr≤0.1%,
Zn≤0.1%,
Ti≤0.1%, and
remainder Al and unavoidable contaminants to maximum total 0.15%, individually maximum 0.05%.

Figure 1B:
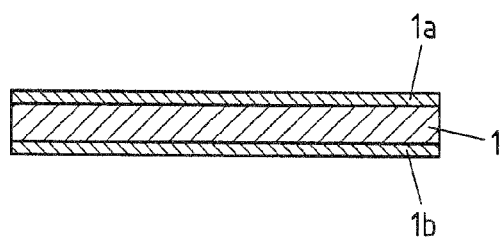

The rolling ingot produced in this way is homogenised at a homogenisation temperature of 550° C. for 8 hours in a furnace 2, so that the added alloy constituents are distributed particularly homogeneously in the rolling ingot, FIG. 1a). FIG. 1b) now shows that aluminium alloy layers 1a and 1b are applied on the rolling ingot 1 so that these can be welded to the rolling ingot by hot rolling. The aluminium alloy layers 1a and 1b for example consist of aluminium alloys type AA8079 or AA5005A, which in material state 0 (corresponding to state T4) after solution annealing have a lower tensile strength Rm than that of the AlMgSi alloy layer, i.e. for example less than 180 MPa. However other aluminium alloys are conceivable for the external aluminium alloy layers, for example other low-alloyed aluminium alloys such as alloy types AA1XXX, for example AA1200.

Figure 1C:
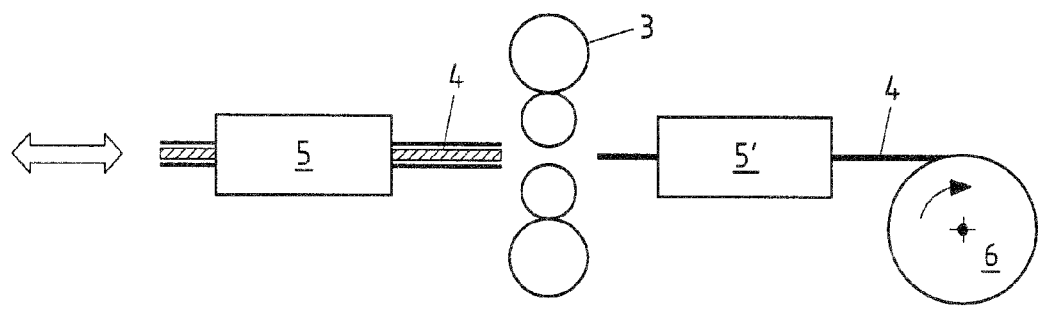

The rolling ingot 1 with the applied aluminium alloy layers or cladding layers is hot rolled, in the embodiment example according to the invention shown in FIG. 1c), by reversing through a hot-roll mill 3, wherein the rolling ingot 1 has a temperature of 400 to 550° C. during hot rolling. In this embodiment example after exiting the hot-roll mill 3 and before the penultimate hot-roll pass, the hot strip 4 preferably has a temperature of at least 400° C., preferably 470 to 490° C. Preferably at this hot-strip temperature, the hot strip 4 is quenched using a plate cooler 5 and the working rolls of the working roll mill 3. For example the hot strip is here cooled to a temperature of 290 to 310° C. before the last hot-roll pass, so that this can be carried out safely and without difficulty and the hot strip can be cooled further. For this the plate cooler 5, indicated merely diagrammatically, sprays cooling rolling emulsion onto the hot strip and ensures an accelerated cooling of the hot strip to the said temperatures. The working rolls of the hot-roll mill are also loaded with emulsion and cool the hot strip 4 further in the last hot-roll pass. After the last roll pass, the hot strip 4 has a temperature of 230 to 200° C. at the exit from the plate cooler 5' in the present embodiment example and is then coiled via the recoiler 6 at this temperature.

Figure 1D:
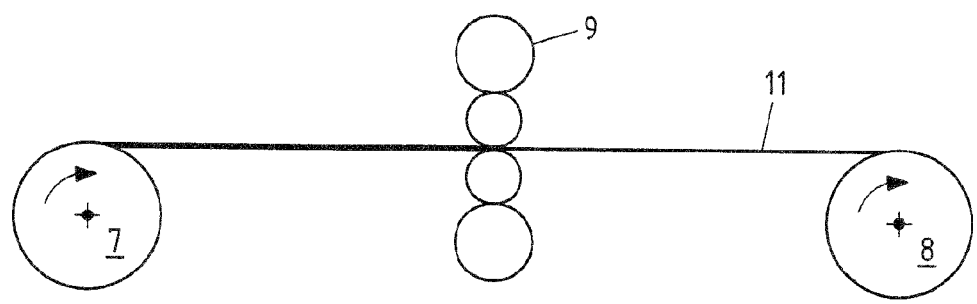

Because the hot strip 4 immediately at the exit from the last hot-roll pass has a temperature of over 135° C. to 250° C., preferably 200 to 330° C., or optionally is brought to said temperatures in the last two hot-roll passes using the plate cooler and working rolls of the hot-roll mill 3, the hot strip 4, despite the increased coiling temperature, has a crystalline microstructural state which leads to very good uniform elongation values $A_g$ in state T4 of more than 23%, preferably more than 25%. Despite the frozen microstructural state, the hot strip can be processed and coiled with relatively high speed at said temperatures. The hot strip is coiled via the recoiler 6 with a thickness of 3 to 12 mm, preferably 3 to 5 mm. Since no coarse $Mg_2Si$ precipitations can form at the relatively low coiling temperatures, the core alloy layer has a particularly advantageous crystalline state and can therefore be cold rolled very well, for example using a cold-rolling mill 9, and recoiled onto the recoiler 8, FIG. 1d).

Figure 1E:
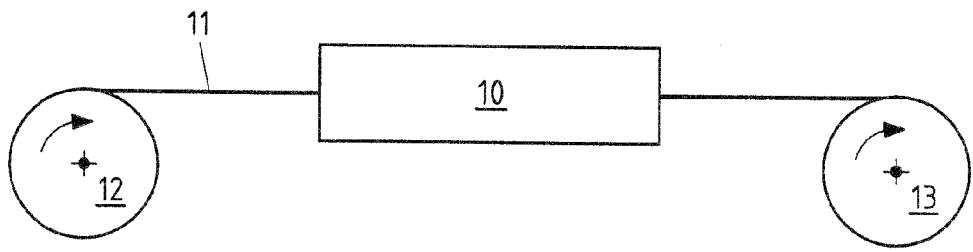

The resulting cold-rolled strip 11 is coiled. Then it undergoes solution annealing at a temperature of typically 500 to 570° C. and quenching 10, FIG. 1e). For this it is again decoiled from the coil 12, solution-treated and quenched in a furnace 10, and recoiled into a coil 13. After natural ageing at room temperature, the aluminium strip can then be delivered in state T4 with maximum formability.

With greater aluminium strip thicknesses, for example for chassis applications or components such as for example brake anchor plates, alternatively piece annealing can be carried out and the sheets quenched afterwards.

In state T6, which is achieved by artificial ageing at 100° C. to 220° C., the strip according to the invention shows a further rise in yield point value so that particularly high strengths are achieved. The artificial ageing can take place for example at 205° C. for 30 minutes. The strips produced according to the embodiment shown here, from an aluminium alloy composite material, after cold rolling for example have a thickness of 0.5 to 4.5 mm. Strip thicknesses of 0.5 to 2 mm are normally used for bodywork applications and strip thicknesses of 2.0 mm to 4.5 mm for chassis components in motor vehicle construction. In both application fields, the improved uniform elongation values are a decisive advantage in the production of components since usually very strong forming of the sheets is carried out and nonetheless high strengths are required in usage state T6 of the end product. The improved bendability of the strips according to the invention, which as already stated above allow particularly small bend angles, is added on top of this.

Figure 2:
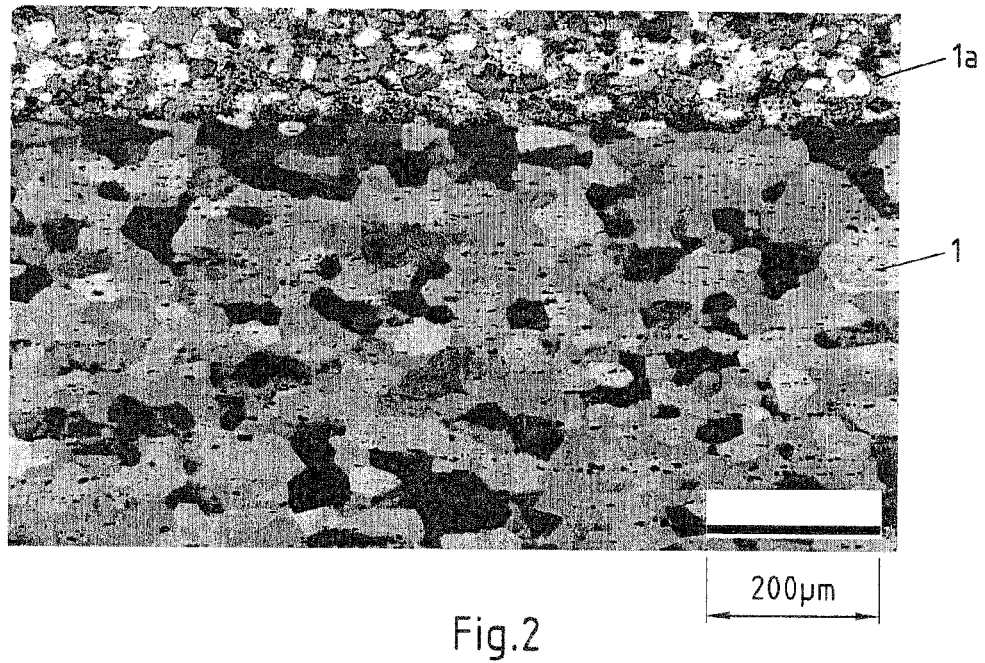
FIG. 2 a longitudinal ground section of a strip according to the invention, anodised, according to Barker with polarised light.

To achieve the improved bending behaviour, it is advantageous if the external aluminium alloy layers have grain sizes of less than 50 µm, preferably less than 25 µm. A longitudinal ground section according to Barker through an embodiment example of a strip 1 produced according to the invention is shown in FIG. 2 in greatly magnified view. It is clear that the external aluminium alloy layer 1a, which is here formed by an aluminium alloy type AA8079, has a much smaller grain size than the core alloy layer. In this embodiment example average grain sizes of around 20 µm were measured.

Figure 3:
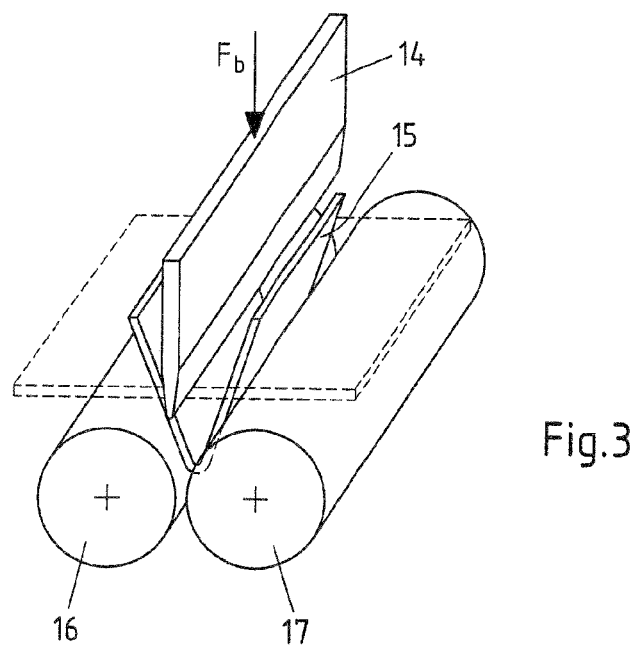
FIG. 3 in a perspective view, the experiment arrangement for performance of the bending test.
Figure 4:
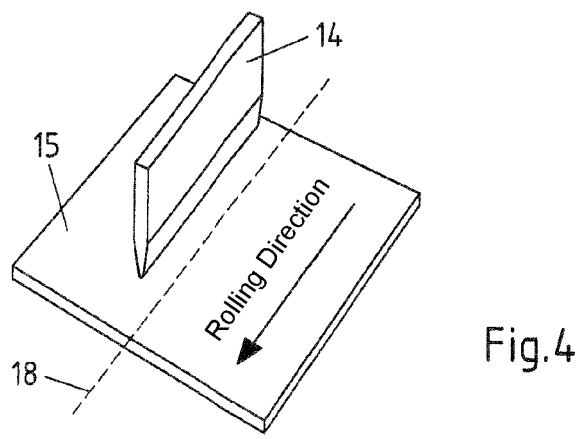
FIG. 4 in a perspective diagrammatic depiction, the arrangement of the bending punch in relation to the rolling direction on performance of the bending test.
Figure 5:
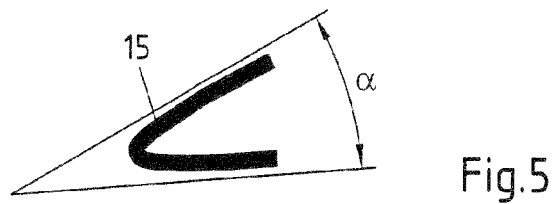
FIG. 5 diagrammatically, measurement of the bend angle on a bent specimen according to a further embodiment example.

FIG. 3 shows in a perspective view the test arrangement for performance of bending tests to determine the maximum bend angle. The tests are based on the specification 238-100 of the Association of the German Automotive Industry (VDA). The test arrangement consists of a bending punch 14, which in the present case has a punch radius of 0.4 mm. The specimen 15 was previously cut to size 270 mm×60 mm transverse to the rolling direction. The specimen 15 was then expanded with pre-elongation of 10% transverse to the rolling direction, with a pre-elongation speed of 25 mm/min and a free clamping length of 150 mm. Then from this the specimen 15 was cut to a size 60×60 mm and placed in the bending jig. The bending punch 14, which, as shown in FIG. 4, runs parallel to the rolling direction so that the bending line 18 also runs parallel to the rolling direction, now presses the specimen with force $F_b$ between two rollers 16, 17 with roll diameter of 30 mm which are arranged spaced apart by twice the specimen thickness (table 2) or twice specimen thickness plus 0.5 mm (table 3). The bending force $F_b$ is measured while the bending punch 14 bends the specimen 15. When the bending force $F_b$ reaches the maximum and then falls by 30 N, the maximum achievable bend angle is reached. Specimen 15 is then taken from the bending jig and the bend angle measured as shown in FIG. 5.

As representative of a typical AlMgSi alloy, the alloy Core1 was used as a core alloy layer, the alloy constituents of which are shown in table 1. In addition two different external aluminium alloy layers Clad1, Clad2 were used, the composition of which is also shown in table 1.

TABLE 1

| Alloy | Si w. % | Fe w. % | Cu w. % | Mn w. % | Mg w. % | Cr w. % | Zn w. % | Ti w. % |
|---|---|---|---|---|---|---|---|---|
| Core1 | 1.3 | 0.20 | — | 0.06 | 0.3 | — | — | 0.03 |
| Clad1 | 0.125 | 1.11 | 0.0002 | — | — | — | 0.0029 | — |
| Clad2 | 0.14 | 0.25 | 0.03 | 0.02 | 0.9 | — | — | — |

Taking into account the method described in FIGS. 1a)-e), strips were produced and solution annealed. In the test series shown in table 2, the solution annealing took place in the laboratory using a salt bath on sheets cut from correspondingly roll-hardened strips with final thickness. The specimens were then quenched in the water basin and aged for 7 days. This corresponds approximately to state T4 as also achieved in mass production by the use of a continuous strip furnace.

TABLE 2

| Test No. | Alloy | Annealing in salt bath | Thickness mm | $R_{p0.2}$ N/mm² | Rm N/mm² | $A_g$ % | $A_{80\ mm}$ % | Bend angle |
|---|---|---|---|---|---|---|---|---|
| VLG1 | T4 Core1 | 60 sec 520° | 1.58 | 108 | 222 | 24.0 | 29.2 | 49.3 |
| VGL2 | T4 Core1 | 20 sec 540° | 1.58 | 111 | 224 | 24.4 | 29.4 | 47.5 |
| VGL3 | T4 Core1 | 60 sec 540° | 1.58 | 110 | 225 | 24.7 | 30.4 | 48.5 |
| Inv 1 | T4 Core1 + Clad1 | 60 sec 540° | 1.58 | 94 | 196 | 24.3 | 29.8 | 36.9 |
| Inv 2 | T4 Core1 + Clad1 | 20 sec 540° | 1.58 | 93 | 199 | 25.3 | 30.9 | 37.3 |
| Inv 3 | T4 Core1 + Clad1 | 60 sec 540° | 1.58 | 93 | 199 | 24.6 | 30.3 | 36.0 |
| VGL4 | T4 Core1 | 60 sec 520° | 1.50 | 103 | 213 | 24.4 | 28.6 | 50.2 |
| VGL5 | T4 Core1 | 20 sec 540° | 1.50 | 102 | 216 | 25.5 | 31.0 | 47.5 |
| VGL6 | T4 Core1 | 60 sec 540° | 1.50 | 102 | 216 | 24.7 | 29.5 | 44.3 |

It is evident from table 2 that the embodiments Inv1, Inv2, Inv3 according to the invention, in comparison with the comparative examples VLG1-VLG6, achieve significantly smaller bend angles i.e. the opening angle of the bent specimens were significantly smaller than in the comparison strips. The bend angles amounted to 36° to 37.3° in the alloy strips clad according to the invention. The unclad comparative examples however only showed minimum bend angles of more than 44°. The uniformity elongation $A_g$ of the embodiments according to the invention, despite the cladding layer arranged on both sides, was still very high at over 24%.

TABLE 3

| Test No. | Alloy | Position in strip | Thickness mm | $R_{p0.2}$ N/mm² | Rm N/mm² | $A_g$ % | $A_{80}$ % | Bend angle* ° |
|---|---|---|---|---|---|---|---|---|
| Inv5 | T4 Core1 + Clad1 | Strip start | 1.50 | 85 | 187 | 25.7 | 29.9 | 31.4 |
| Inv6 | T4 Core1 + Clad1 | Strip centre | 1.50 | 84 | 186 | 26.0 | 29.9 | 31.5 |
| Inv7 | T4 Core1 + Clad2 | Strip start | 1.50 | 92 | 198 | 23.3 | 27.5 | 36.4 |
| Inv 8 | T4 Core1 + Clad2 | Strip end | 1.50 | 93 | 196 | 23.2 | 27.4 | 36.3 |
| VGL7 | Soft AA5182 | Strip start | 1.50 | 138 | 278 | 23.4 | 26.0 | 68.7 |

*Bend angle measured with modified roll spacing

Table 3 shows the measurement results of embodiments according to the invention which were produced totally industrially, i.e. here too, the solution annealing step to achieve state T4 in tests Inv5 to Inv8 was carried out in a continuous strip furnace. All measurements given in table 3 were taken on strips with thickness 1.50 mm and hence on slightly thinner strips in comparison with the measurements in table 2. Strips Inv5 to Inv8 were also aged for 19 days at room temperature. For comparison, table 3 shows an aluminium alloy AA5182 typically used for automotive engineering. In the bending tests, in contrast to table 2, a modified roll spacing was selected which corresponded to twice the thickness of the specimen to be measured plus 0.5 mm. This test arrangement, conventional in the automotive industry, gives very reproducible measurement results for the minimum bend angle. For the comparison example VGL7, only a minimum bend angle of 68.7° could be achieved. The embodiment examples according to the invention, however, achieved bend angles of minimum 31.4° and hence are particularly suitable for example for the production of flanged folds, as occur frequently in automotive engineering. The improved bending behaviour is reflected in particular in the improved appearance of the bend edge, which has a very homogenous appearance because of the fine-grained recrystallised external aluminium alloy layer.

What is claimed is:

1. Strip consisting of an aluminium material for production of components with high forming requirements, wherein the strip has a core layer of an AlMgSi alloy of the type AA6014, AA6016, AA6060 or AA6181 and at least one external aluminium alloy layer arranged on one or both sides and made of a non-hardenable aluminium alloy, wherein the at least one external aluminium alloy layer has a lower tensile strength than the core layer of an AlMgSi alloy in state T4, in state T4, the strip has uniform elongation $A_g$ of more than 23% transverse to the rolling direction and with a thickness of 1.5 mm to 1.6 mm, a bend angle of less than 40° is achieved in the bending test transverse to the rolling direction and the at least one external aluminium alloy layer consists of an aluminium alloy type AA8xxx or AA1200, wherein the strip is achieved in that a rolling ingot is cast from an AlMgSi alloy of the type AA6014, AA6016, AA6060, or AA6181, the rolling ingot undergoes homogenisation, after homogenization a cladding layer consisting of an aluminium of the type AA8xxx or AA1200 applied at least on one or both sides of the rolling ingot, and the rolling ingot together with the applied cladding layers brought to hot rolling temperature, roll cladding at hot rolling temperatures, then optionally cold rolled to final thickness, and the finished rolled strip solution annealed and quenched, wherein the hot rolled strip is quenched after roll cladding.

2. The strip of claim 1, wherein the cladding layer consists of an aluminium of the type AA8079.

3. A method of forming a component, chassis or structural part or panel in automotive, aircraft or railway vehicle construction, comprising:
   producing a sheet from strip consisting of an aluminium material for production of components with high forming requirements, wherein the strip has a core layer of an AlMgSi alloy of the type AA6014, AA6016, AA6060 or AA6181 and at least one external aluminium alloy layer arranged on one or both sides and made of non-hardenable aluminum alloy, wherein the at least one external aluminium alloy layer has a lower tensile strength than the core layer of an AlMgSi alloy in state T4, in state T4, the strip has uniform elongation $A_g$ of more than 23% transverse to the rolling direction and with a thickness of 1.5 mm to 1.6 mm, a bend angle of less than 40° is achieved in the bending test transverse to the rolling direction and the at least one external aluminum alloy layer consists of an aluminum alloy type AA8xxx or AA1200, wherein the strip is achieved in that a rolling ingot is cast from an AlMgSi alloy of the type AA6014, AA0616, AA6060, or AA6181, the rolling ingot undergoes homogenisation, a cladding layer consisting of an aluminum of the type AA8xxx, AA8079 or AA1200 applied at least on one or both sides of the rolling ingot, and the rolling ingot together with the applied cladding layers brought to hot rolling temperature, roll cladding at hot rolling temperatures, then optionally cold rolled to final thickness, and the finished rolled strip solution annealed and quenched, wherein the hot rolled strip is quenched after roll cladding; and
   unitizing the sheet to from the component, chassis or structural part or panel in automotive or railway vehicle construction, wherein the at least one external aluminium alloy has a grain size of less than 50 µm.

4. A method of forming a component, chassis or structural part or panel in automotive, aircraft or railway vehicle construction, comprising:
   producing a sheet from the strip according to claim 1; and
   utilizing the sheet to form the component, chassis or structural part or panel in automotive or railway vehicle construction.

5. The method of claim 4, wherein the utilizing step comprises utilizing the sheet as a component, chassis part, external or internal panel in automotive engineering.

6. The method of claim 4, wherein the component, chassis part, external or internal panel is a bodywork element.

7. The method of claim 3, wherein the cladding layer consists of an aluminium of the type AA8079.

8. A method of forming a component, chassis or structural part or panel in automotive, aircraft or railway vehicle construction, comprising:
   producing a sheet from strip consisting of an aluminium material for production of components with high forming requirements, wherein the strip has a core layer of an AlMgSi alloy of the type AA6014, AA6016, AA6060 or AA6181 and at least one external aluminium alloy layer arranged on one or both sides and made of non-hardenable aluminum alloy, wherein the at least one external aluminium alloy layer has a lower tensile strength than the core layer of an AlMgSi alloy in state T4, in state T4, the strip has uniform elongation $A_g$ of more than 23% transverse to the rolling direction and with a thickness of 1.5 mm to 1.6 mm, a bend angle of less than 40° is achieved in the bending test transverse to the rolling direction and the at least one external aluminum alloy layer consists of an aluminum alloy type AA8xxx or AA1200, wherein the strip is achieved in that a rolling ingot is cast from an AlMgSi alloy of the type AA6014, AA0616, AA6060, or AA6181, the rolling ingot undergoes homogenisation, a cladding layer consisting of an aluminum of the type AA8xxx or AA1200 applied at least on one or both sides of the rolling ingot, and the rolling ingot together with the applied cladding layers brought to hot rolling temperature, roll cladding at hot rolling temperatures, then optionally cold rolled to final thickness, and the finished rolled strip solution annealed and quenched, wherein the hot rolled strip is quenched after roll cladding; and
   unitizing the sheet to from the component, chassis or structural part or panel in automotive or railway vehicle construction, wherein the at least one external aluminium alloy layer consists of an aluminium alloy type AA8011, AA8006, AA8079 or AA1200.

* * * * *